(12) United States Patent
Tsai et al.

(10) Patent No.: US 7,787,199 B2
(45) Date of Patent: Aug. 31, 2010

(54) CAMERA MODULE AND METHOD FOR MAKING THE SAME

(75) Inventors: Chia-Hsi Tsai, Taipei (TW); Tzu-Kan Chen, Taipei (TW); Meng-Hsin Kuo, Taipei (TW); Cheng-Te Tseng, Taipei (TW); Yi-Ting Lin, Taipei (TW)

(73) Assignees: Silitek Electronic (Guangzhou) Co., Ltd., Guangzhou (CN); Lite-On Technology Corp., Taipei (TW)

( * ) Notice: Subject to any disclaimer, the term of this patent is extended or adjusted under 35 U.S.C. 154(b) by 103 days.

(21) Appl. No.: 12/213,128

(22) Filed: Jun. 16, 2008

(65) Prior Publication Data

US 2009/0195897 A1 Aug. 6, 2009

(30) Foreign Application Priority Data

Feb. 3, 2008 (CN) .................. 2008 1 0026312

(51) Int. Cl.
*G02B 7/02* (2006.01)
*G02B 15/14* (2006.01)
*G03B 17/00* (2006.01)

(52) U.S. Cl. .................. 359/819; 359/697; 359/824; 396/79

(58) Field of Classification Search .......... 359/811–824, 359/694–700; 396/529, 535, 79; 348/209, 348/294, 335, 340, 373, 374
See application file for complete search history.

(56) References Cited

U.S. PATENT DOCUMENTS 5,400,072 A * 3/1995 Izumi et al. .................. 348/335
7,113,351 B2 * 9/2006 Hovanky .................... 359/824

* cited by examiner

*Primary Examiner*—Mohammed Hasan
(74) *Attorney, Agent, or Firm*—Rosenberg, Klein & Lee

(57) ABSTRACT

A camera module includes a lens barrel, a lens, a sensing element, and an electromagnetic shield. The lens barrel defines a receiving space. The lens is mounted in the receiving space. The sensing element is covered by the lens barrel, is disposed below the lens, and is spaced apart from the lens. The sensing element includes a top face, a bottom face, a side face extending between the top and bottom faces, a plurality of first conductors mounted on the bottom face, at least one second conductor mounted on one of the top, bottom, and side faces, and a grounding element having one end connected to one of the first conductors and the other end connected to the second conductor. The electromagnetic shield is coupled to the lens barrel and includes a grounding portion electrically connected to the second conductor.

15 Claims, 14 Drawing Sheets

CAMERA MODULE AND METHOD FOR MAKING THE SAME

CROSS-REFERENCE TO RELATED APPLICATION

This application claims priority of Chinese Application No. 200810026312.4, filed on Feb. 3, 2008.

BACKGROUND OF THE INVENTION

1. Field of the Invention

The invention relates to a camera module, more particularly to a camera module which has protection against electromagnetic interference. The invention also relates to a method for making the camera module.

2. Description of the Related Art

Referring to FIGS. 1 and 2, a conventional camera module 1 includes a lens barrel 11 defining a receiving space 111, a lens 12 received in the receiving space 111, a sensing element 13 covered by the lens barrel 11 and disposed below the lens 12, and an electromagnetic shield 14. The sensing element 13 includes a plurality of conductors 131 mounted on a bottom face thereof. The electromagnetic shield 14 is formed with two opposite engaging holes 141 and has two opposite grounding portions 142 below the engaging holes 141. The lens barrel 11 has two opposite engaging blocks 112. The electromagnetic shield 14 is engaged to the lens barrel 11 mechanically or manually by anchoring the engaging blocks 112 of the lens barrel 11 in the engaging holes 141 of the electromagnetic shield 14 correspondingly so as to provide protection against electromagnetic interference.

A circuit board 15 is provided with a plurality of first conductive pads 151 for connecting to the grounding portions 142 of the electromagnetic shield 14 correspondingly, and a plurality of second conductive pads 152 for connecting to the conductors 131 of the sensing element 13 correspondingly. When the camera module 1 is assembled to the circuit board 15 by surface mount technology, it is required to have precise sizes and locations for the first and second conductive pads 151, 152, the grounding portions 142 of the electromagnetic shield 14, and the conductors 131 of the sensing element 13 so as to connect the grounding portions 142 and the conductors 131 to the first and second conductive pads 151, 152 correspondingly and precisely. However, there are tolerances for the grounding portions 142 and the conductors 131. Therefore, it is relatively difficult to connect the grounding portions 142 of the electromagnetic shield 14 and the conductors 131 of the sensing element 13 to the first and second conductive pads 151, 152 of the circuit board 15 correspondingly and precisely during assembly of the lens barrel 1 to the circuit board 15. The yield of the conventional camera module 1 is not satisfactory, and the cost for producing the conventional camera module 1 is relatively high.

SUMMARY OF THE INVENTION

An object of the present invention is to provide a camera module the yield of which is increased and the production cost thereof is lowered. Another object of the present invention is to provide a method for making the camera module.

In the first aspect of this invention, a camera module includes a lens barrel, a lens, a sensing element, and an electromagnetic shield. The lens barrel defines a receiving space, and has a top opening communicated with the receiving space. The lens is mounted in the receiving space, and is aligned with the top opening. The sensing element is covered by the lens barrel, is disposed below the lens, and is spaced apart from the lens. The sensing element includes a top face, a bottom face, a side face extending between the top and bottom faces, a plurality of first conductors mounted on the bottom face, at least one second conductor mounted on one of the top, bottom, and side faces, and a grounding element having one end connected to one of the first conductors and the other end connected to the second conductor. The electromagnetic shield is coupled to the lens barrel, and includes a grounding portion electrically connected to the second conductor.

In the second aspect of this invention, a method for making a camera module includes the steps of:

providing a lens unit, an electromagnetic shield, and a sensing element, the lens unit including a lens barrel and a lens mounted in the lens barrel, the electromagnetic shield including a grounding portion, the sensing element including a top face, a bottom face, a side face extending between the top and bottom faces, a plurality of first conductors mounted on the bottom face, at least one second conductor mounted on one of the top, bottom, and side faces, and a grounding element having one end connected to one of the first conductors and the other end connected to the second conductor;

coupling the electromagnetic shield to the lens barrel and the sensing element; and connecting the grounding portion of the electromagnetic shield to the second conductor of the sensing element.

In the third aspect of this invention, an electronic device includes a main body and a camera module. The main body is formed with a receiving space and an opening communicated with the receiving space. The camera module is received in the receiving space, and includes a lens barrel, a lens, a sensing element, and an electromagnetic shield. The lens barrel defines a receiving space, and has a top opening communicated with the receiving space of the lens barrel and aligned with the opening of the main body. The lens is mounted in the receiving space of the lens barrel, and is aligned with the top opening. The sensing element is covered by the lens barrel, is disposed below the lens, and is spaced apart from the lens. The sensing element includes a top face, a bottom face, a side face extending between the top and bottom faces, a plurality of first conductors mounted on the bottom face, at least one second conductor mounted on one of the top, bottom, and side faces, and a grounding element having one end connected to one of the first conductors and the other end connected to the second conductor. The electromagnetic shield is coupled to the lens barrel, and includes a grounding portion electrically connected to the second conductor.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
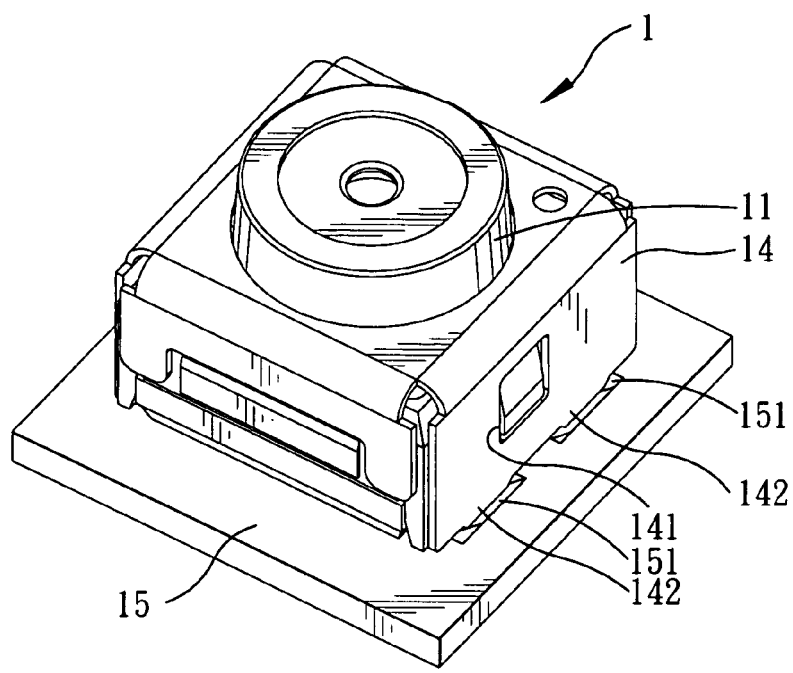
FIG. 1 is a perspective view of a conventional camera module mounted on a circuit board.
Figure 2:
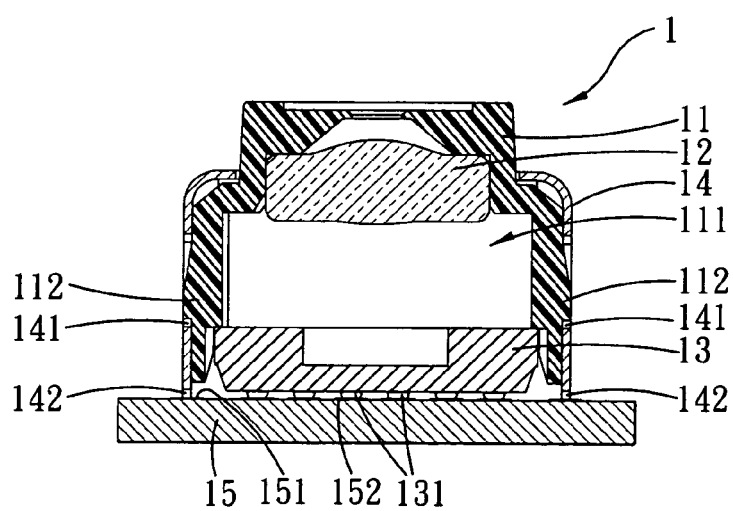
FIG. 2 is a sectional view of the conventional camera module.

Before the present invention is described in greater detail, it should be noted that like elements are denoted by the same reference numerals throughout the disclosure.

Figure 3:
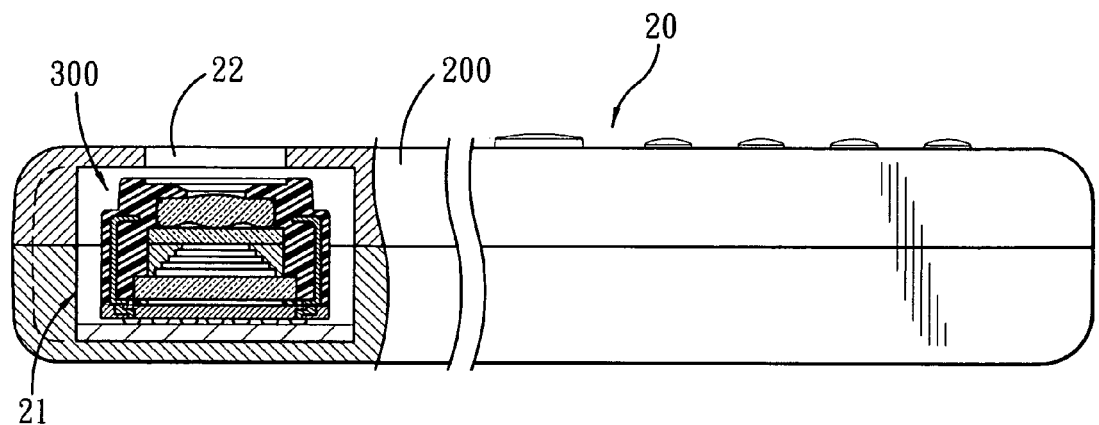
FIG. 3 is a fragmentary partly sectional view of an electronic device including a first preferred embodiment of a camera module according to this invention.
Figure 4:
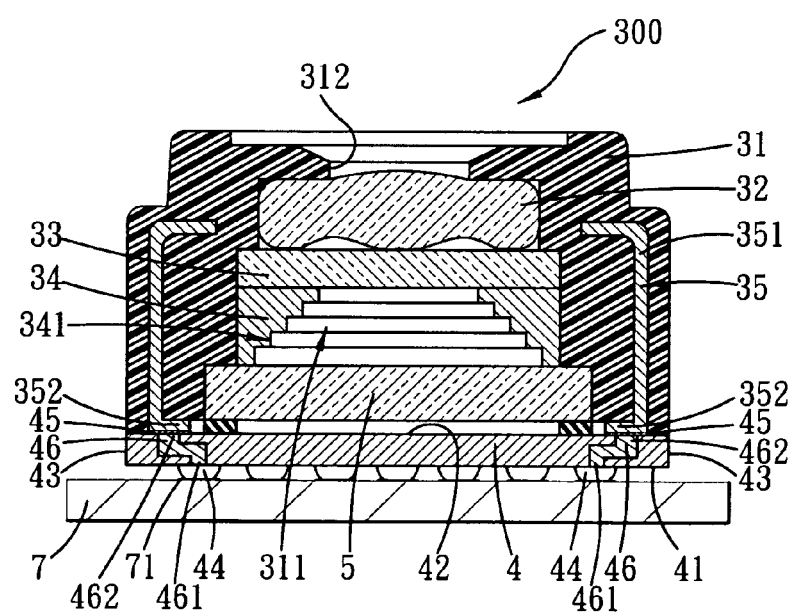
FIG. 4 is a sectional view of the first preferred embodiment mounted on a circuit board.
Figure 5:
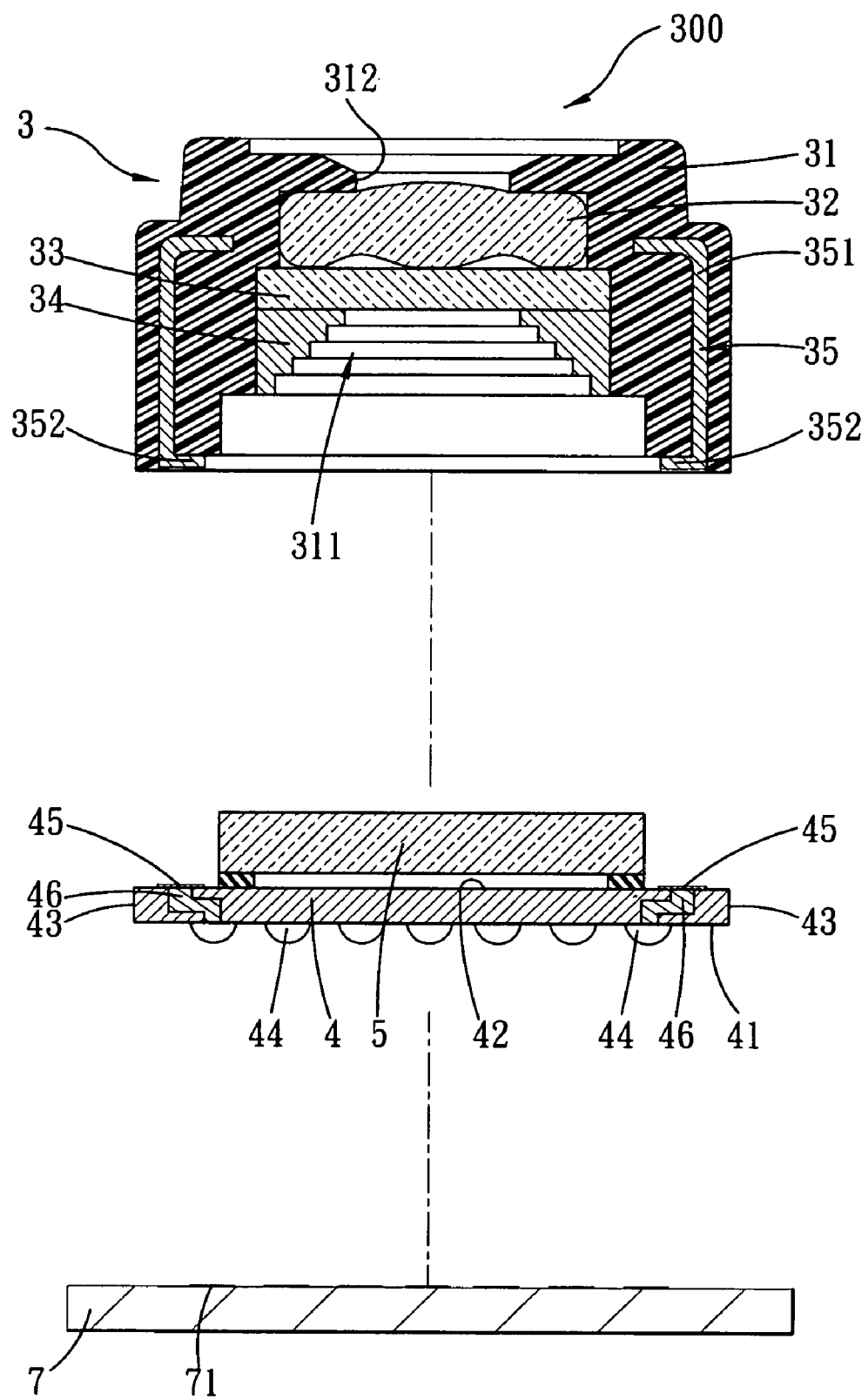
FIG. 5 is an exploded sectional view of the first preferred embodiment.
Figure 6:
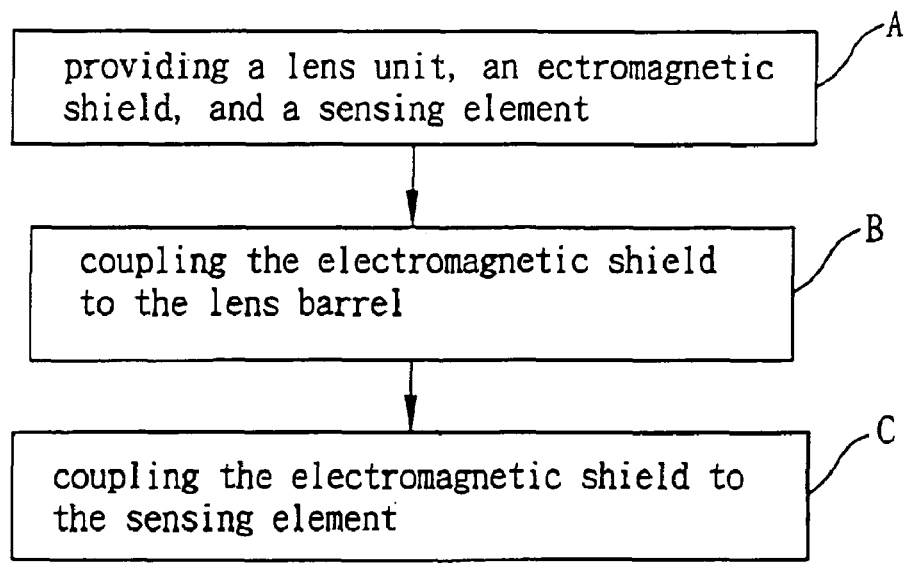
FIG. 6 is a flow chart of a method for making the first preferred embodiment.
Figure 7:
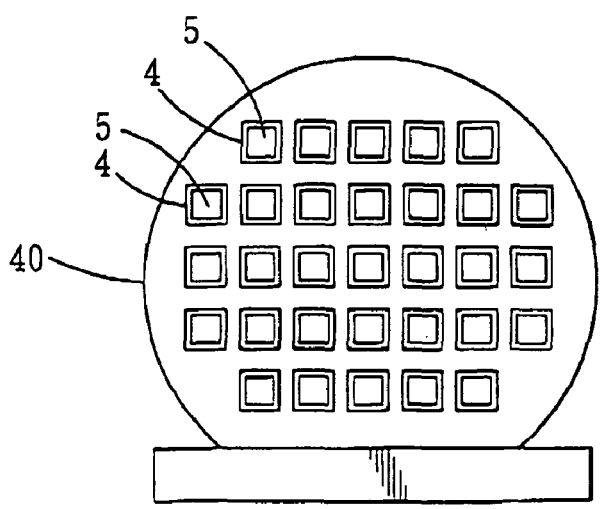
FIGS. 7 to 9 are views illustrating steps of the method for making the first preferred embodiment.
Figure 8:
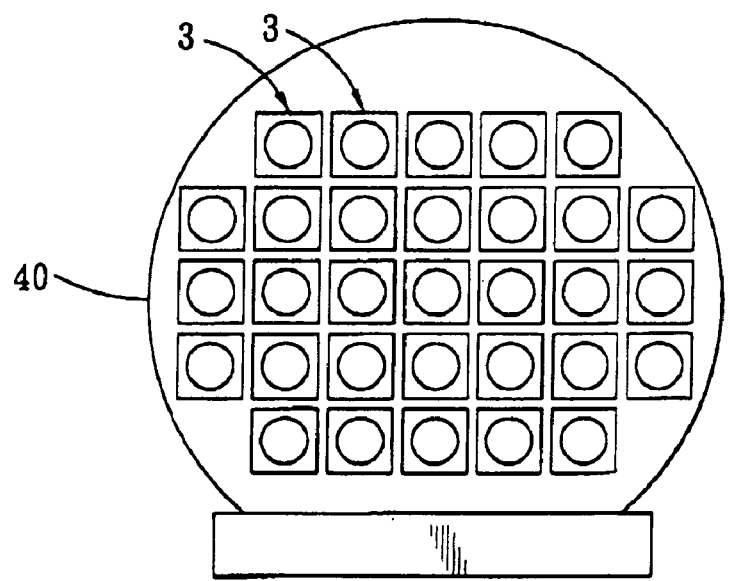
Figure 9:
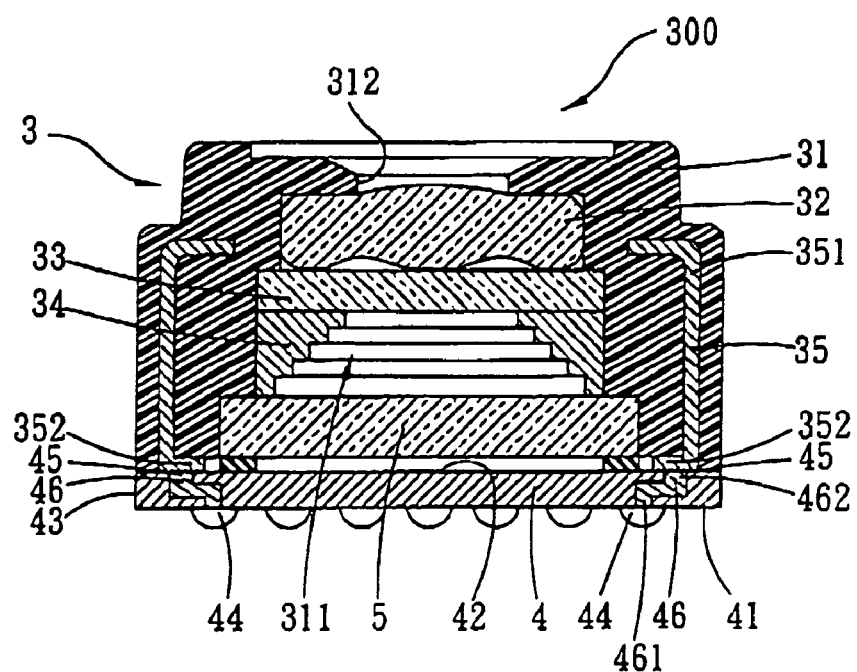

Referring to FIGS. 3 to 5, the first preferred embodiment of a camera module 300 according to this invention is installed in an electronic device 20, which is illustrated as a cellular phone. The camera module 300 can be installed in a personal digital assistant (PDA) or other portable electronic devices. The electronic device 20 includes a main body 200 and the camera module 300. The main body 200 is formed with a receiving space 21 and an opening 22 communicated with the receiving space 21. The camera module 300 is received in the receiving space 21, and includes a lens unit 3, a sensing element 4, a dustproof element 5, and an electromagnetic shield 35.

The lens unit 3 includes a lens barrel 31, a lens 32, a filter 33, and a spacing ring 34. The lens barrel 31 is made of a plastic material, defines a receiving space 311, and has a top opening 312 communicated with the receiving space 311 and aligned with the opening 22 of the main body 200. The lens 32, the filter 33, the spacing ring 34, and the dustproof element 5 are mounted in the receiving space 311 of the lens barrel 31. The lens 32 is aligned with the top opening 312, and is mounted on the filter 33. The filter 33 used in the preferred embodiment is an infrared (IR) filter. The spacing ring 34 is mounted between the filter 33 and the dustproof element 5. The spacing ring 34 has a certain thickness, and confines a through hole 341 aligned with the opening 22 of the main body 200 and the top opening 312 of the lens barrel 31.

The sensing element 4 is covered by the lens barrel 31, is disposed below the dustproof element 5, and is spaced apart from the lens 32. The sensing element includes a top face 42, a bottom face 41, two side faces 43 each extending between the top and bottom faces 42, 41, a plurality of first conductors 44 mounted on the bottom face 41, two second conductors 45 mounted opposite to each other on the top face 42, and two grounding elements 46. Each of the second conductors 45 is formed as a conductive metal pad. Each of the grounding elements 46 is made of a metal material, and has one end 461 connected to one of the first conductors 44 and the other end 462 connected to a corresponding one of the second conductors 45.

The electromagnetic shield 35 is made of a metal material and provides protection against electromagnetic interference. In this preferred embodiment, the electromagnetic shield 35 is embedded in the lens barrel 31 by insert molding so as to be coupled to the lens barrel 31. The electromagnetic shield 35 includes a shield body 351 and two grounding portions 352 extending from the shield body 351 and electrically connected to the second conductors 45 correspondingly so that each of the grounding portions 352 of the electromagnetic shield 35 is connected electrically to a corresponding one of the first conductors 44 via a corresponding one of the second conductors 45 and a corresponding one of the grounding elements 46. In this preferred embodiment, each of the grounding portions 352 of the electromagnetic shield 35 is formed as a connecting leg provided at a bottom part of the lens barrel 31 and abutting against a corresponding one of the second conductors 45 of the sensing element 4.

Since the distance between the sensing element 4 and the lens 32 is maintained by using the spacing ring 34, the effect of assembly tolerance can be minimized and the need to adjust the focal distance can be avoided. It should be noted that the thickness of the spacing ring 34 is chosen according to requirements, i.e., the desired focal distance between the lens 32 and the sensing element 4. Furthermore, since the electromagnetic shield 35 is embedded in the lens barrel 31 by insert molding, and since each of the grounding portions 352 of the electromagnetic shield 35 is connected electrically to a corresponding one of the first conductors 44 via a corresponding one of the second conductors 45 and a corresponding one of the grounding elements 46, the grounding portions 352 of the electromagnetic shield 35 can be connected electrically to the circuit board 7 in an easy and precise manner by connecting the first conductors 44 to the conductive pads 71 of the circuit board 7 correspondingly. Therefore, the yield of the camera module 300 is increased as compared to the aforesaid prior art.

Referring to FIGS. 6 to 9, a method for making the first preferred embodiment of the camera module 300 includes the steps of:

A) Providing a Lens Unit 3, the Electromagnetic Shield 35, and the Sensing Element 4:

The lens unit 3 includes the lens barrel 31, and the lens 32, the filter 33, and the spacing ring 34 mounted in the lens barrel 31. The electromagnetic shield 35 includes two opposite grounding portions 352. A plurality of the sensing elements 4 are provided on a wafer 40, and a plurality of the dustproof elements 5 are respectively mounted on the sensing elements 4 in an automated manner. The sensing element 4 includes the top face 42, the bottom face 41, the side faces 43 extending between the top and bottom faces 42, 41, the first conductors 44 mounted on the bottom face 41, the second conductors 45 mounted on the top face 42, and the grounding elements 46 each having one end 461 connected to one of the first conductors 44 and the other end 462 connected to a corresponding one of the second conductors 45.

B) Coupling the Electromagnetic Shield 35 to the Lens Barrel 31:

The electromagnetic shield 35 is embedded in the lens barrel 31 by insert molding so as to be coupled to the lens barrel 31.

C) Coupling the Electromagnetic Shield 35 to the Sensing Element 4:

A plurality of the lens units 3 are mounted on the sensing elements 4 of the wafer 4 correspondingly, and the grounding portions 352 of the electromagnetic shields 35 are connected to the second conductors 45 of the sensing elements 4 correspondingly, for example, using a glue, so as to assemble the lens units 3 to the sensing elements 4 correspondingly. The wafer 4 is baked so that the lens units 3 are firmly connected to the sensing elements 4. A plurality of the camera modules 300 are obtained by cutting the wafer 4.

Figure 10:
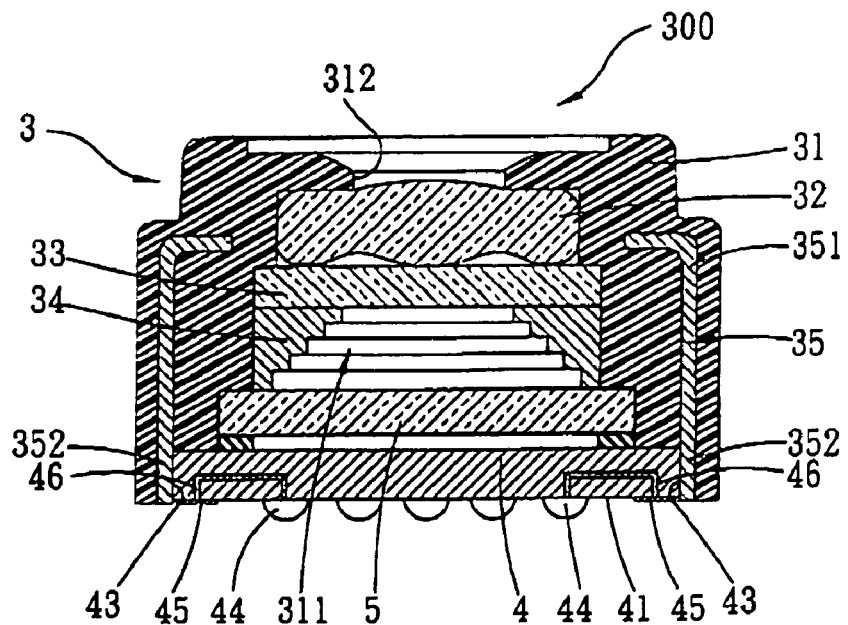
FIG. 10 is a sectional view of a second preferred embodiment of a camera module according to this invention.

Referring to FIG. 10, the second preferred embodiment of a camera module 300 according to this invention is shown to be similar to the first preferred embodiment except that the second conductors 45 are formed as conductive pads mounted on the bottom face 41 of the sensing element 4 and extending to the side faces 43 of the sensing element 4 and that each of the grounding portions 352 of the electromagnetic shield 35 is formed as a connecting leg provided at a bottom part of the lens barrel 31 and abutting against a corresponding one of the side faces 43 of the sensing element 4 and a corresponding one of the conductive pads.

Figure 11:
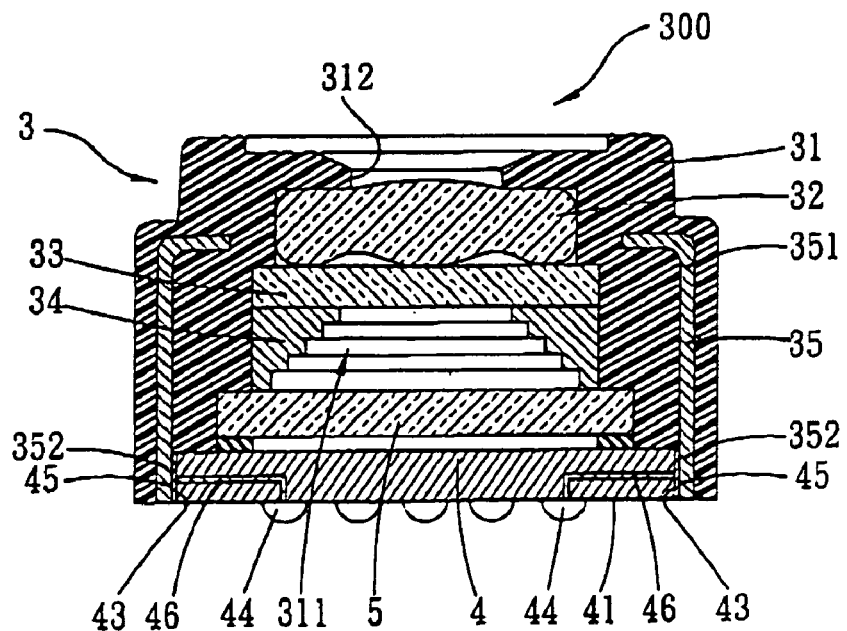
FIG. 11 is a sectional view of a third preferred embodiment of a camera module according to this invention.

Referring to FIG. 11, the third preferred embodiment of a camera module 300 according to this invention is shown to be similar to the first preferred embodiment except that each of the second conductors 45 is formed as a conductive pad mounted on a corresponding one of the side faces 43 of the sensing element 4 and that each of the grounding portions 352 of the electromagnetic shield 35 is formed as a connecting leg provided at a bottom part of the lens barrel 31 and abutting against a corresponding one of the conductive pads.

Figure 12:
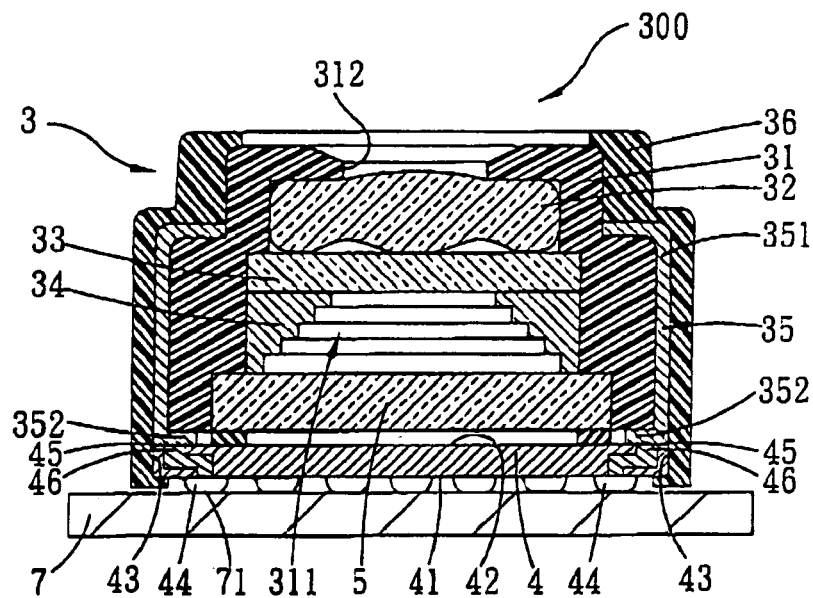
FIG. 12 is a sectional view of a fourth preferred embodiment of a camera module according to this invention.
Figure 13:
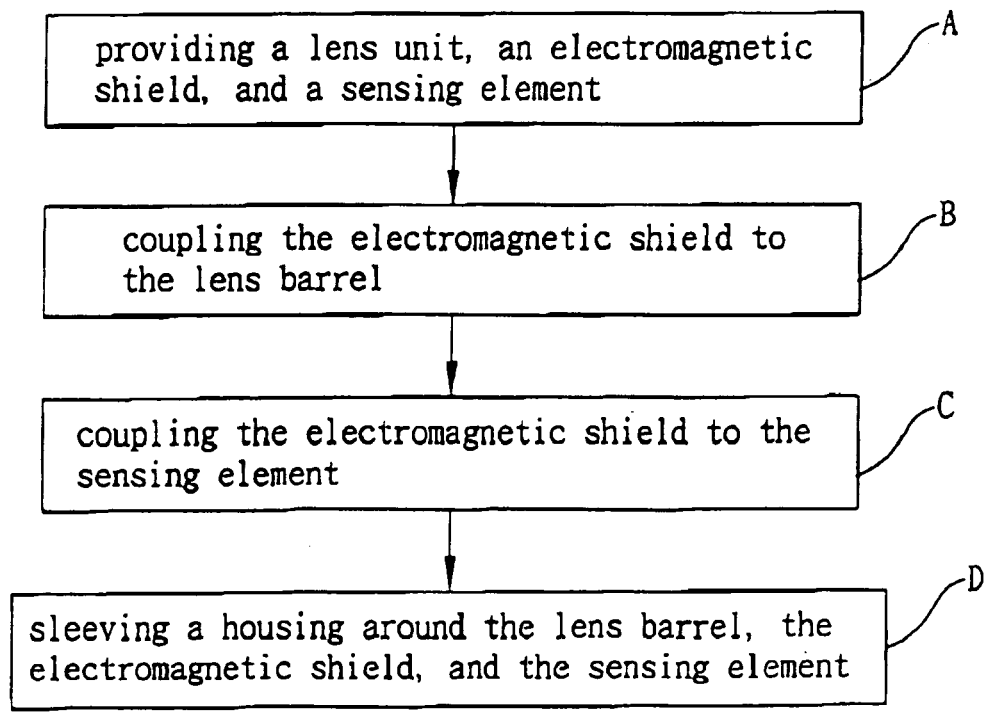
FIG. 13 is a flow chart of a method for making the fourth preferred embodiment.
Figure 14:
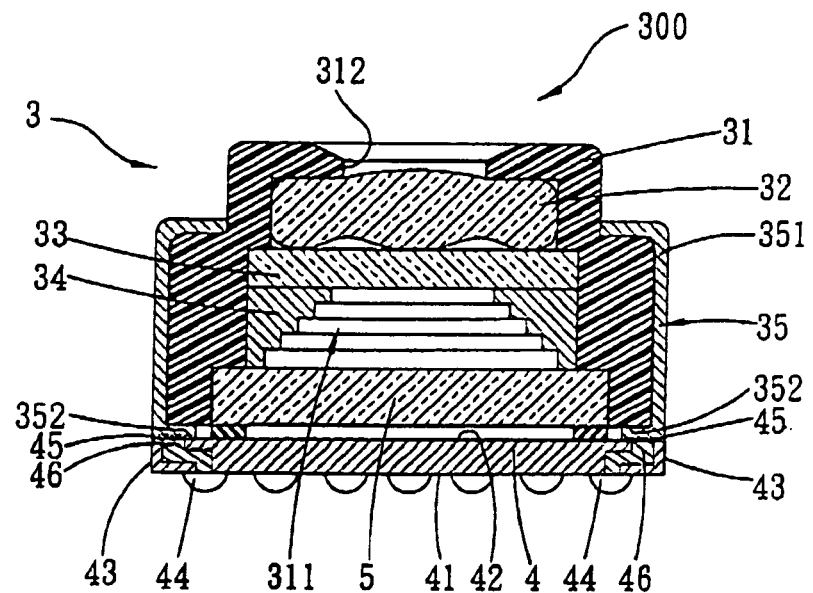
FIG. 14 is a sectional view illustrating an intermediate product of the method for making the fourth preferred embodiment.

Referring to FIGS. 12 to 14, the fourth preferred embodiment of a camera module 300 according to this invention is shown to be similar to the first preferred embodiment except that the electromagnetic shield 35 is sleeved on the lens barrel 31 and that the camera module 300 further includes a housing 36 sleeved around the lens barrel 31, the electromagnetic shield 35, and the sensing element 4.

A method for masking the fourth preferred embodiment is similar to that for the first preferred embodiment except that the electromagnetic shield 35 is coupled to the sensing element 4 by sleeving the electromagnetic shield 35 on the sensing element 4 and that the method for making the fourth preferred embodiment further includes a step of sleeving the housing 36 around the lens barrel 31, the electromagnetic shield 35, and the sensing element 4 by insert molding.

Figure 15:
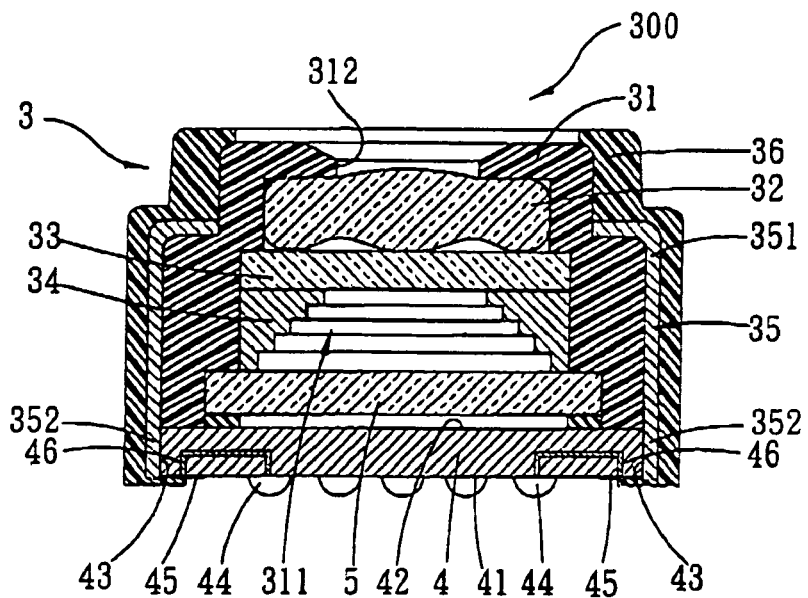
FIG. 15 is a sectional view of a fifth preferred embodiment of a camera module according to this invention.

Referring to FIG. 15, the fifth preferred embodiment of a camera module 300 according to this invention is shown to be similar to the fourth preferred embodiment except that the second conductors 45 are formed as conductive pads mounted on the bottom face 41 of the sensing element 4 and extending to the side faces 43 of the sensing element 4 and that each of the grounding portions 352 of the electromagnetic shield 35 is formed as a connecting leg provided at a bottom part of the lens barrel 31 and abutting against a corresponding one of the side faces 43 of the sensing element 4 and a corresponding one of the conductive pads.

Figure 16:
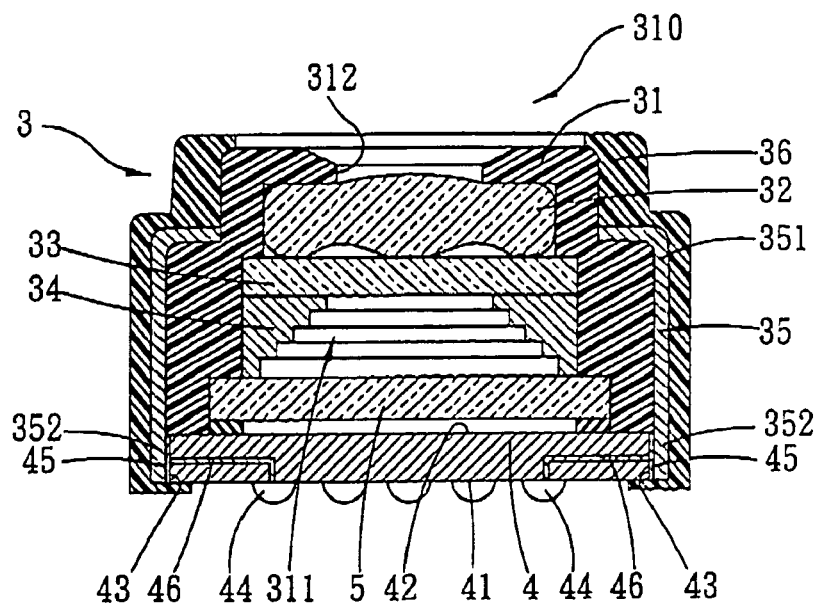
FIG. 16 is a sectional view of a sixth preferred embodiment of a camera module according to this invention.

Referring to FIG. 16, the sixth preferred embodiment of a camera module 300 according to this invention is shown to be similar to the fourth preferred embodiment except that each of the second conductors 45 is formed as a conductive pad mounted on a corresponding one of the side faces 43 of the sensing element 4 and that each of the grounding portions 352 of the electromagnetic shield 35 is formed as a connecting leg provided at a bottom part of the lens barrel 31 and abutting against a corresponding one of the conductive pads.

Figure 17:
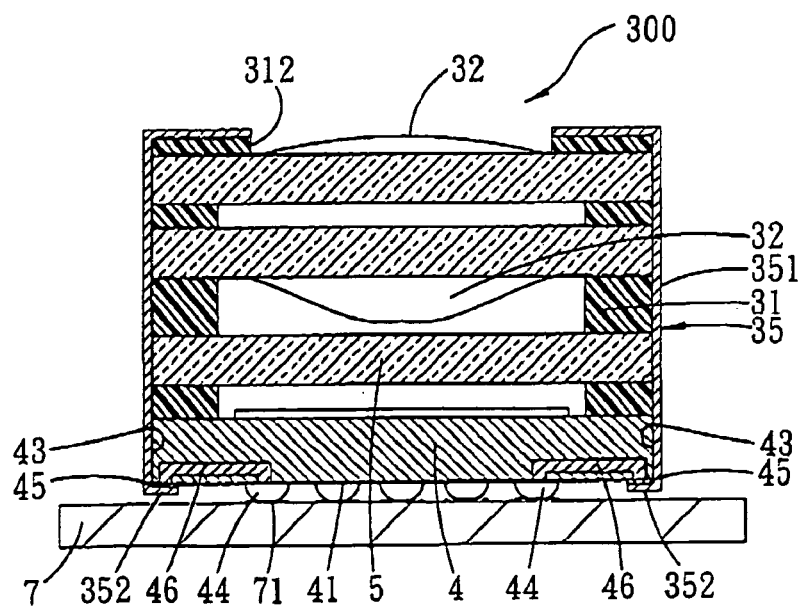
FIG. 17 is a sectional view of a seventh preferred embodiment of a camera module according to this invention mounted on a circuit board.
Figure 18:
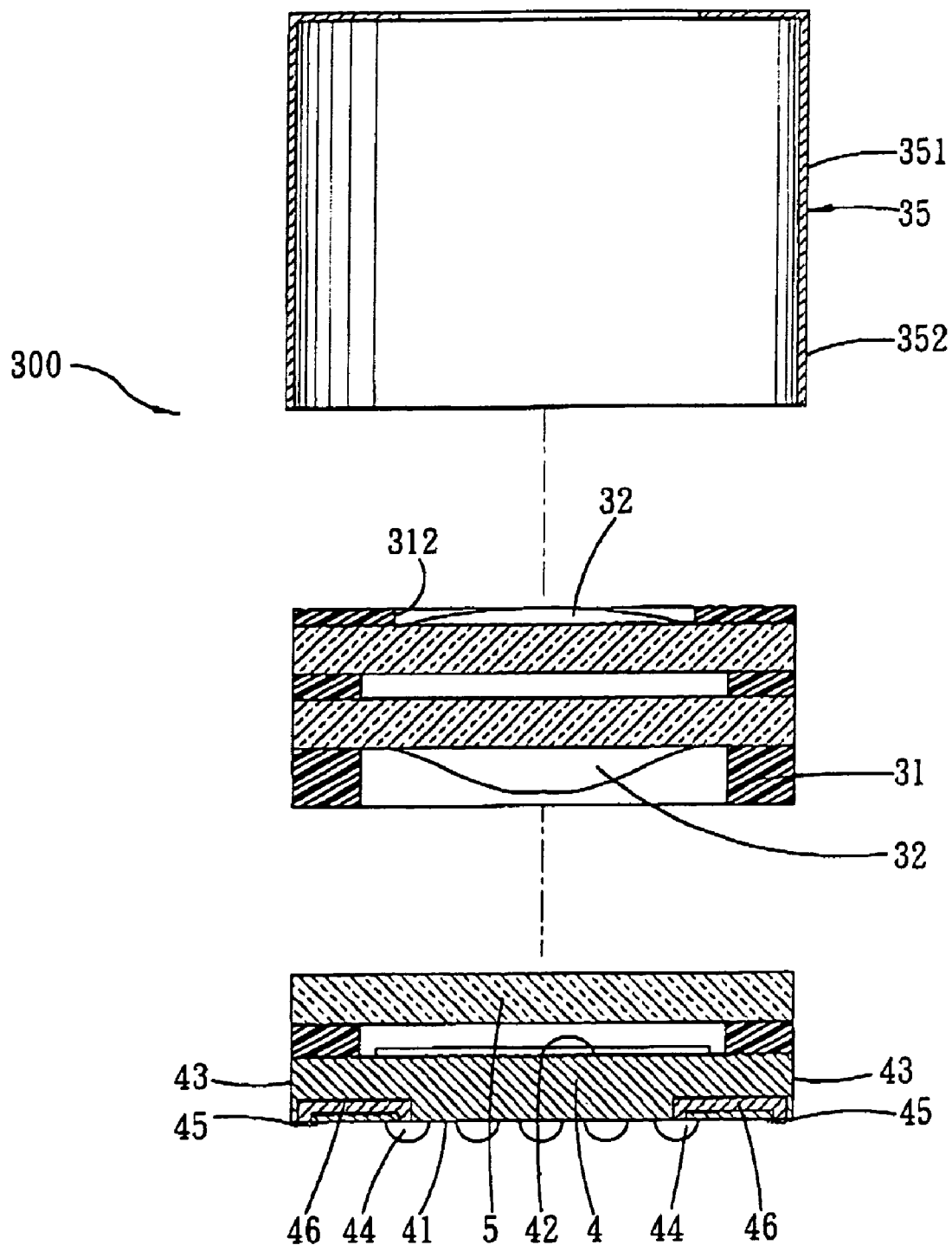
FIG. 18 is an exploded sectional view of the seventh preferred embodiment.

Referring to FIGS. 17 and 18, the seventh preferred embodiment of a camera module 300 according to this invention is similar to the first preferred embodiment except that two lenses 32 are mounted in the lens barrel 31 and that the electromagnetic shield 35 is sleeved around the lens barrel 31 and the sensing element 4. Furthermore, in this preferred embodiment, the second conductor 45 is formed as a conductive pad mounted on the bottom face 41 of the sensing element 4. The grounding portion 352 of the electromagnetic shield 35 is formed as a connecting leg provided at a bottom part of the lens barrel 31 and abutting against the conductive pad. A filter and a spacing ring (not shown in the figures) can be optionally received in the lens barrel 31.

Figure 19:
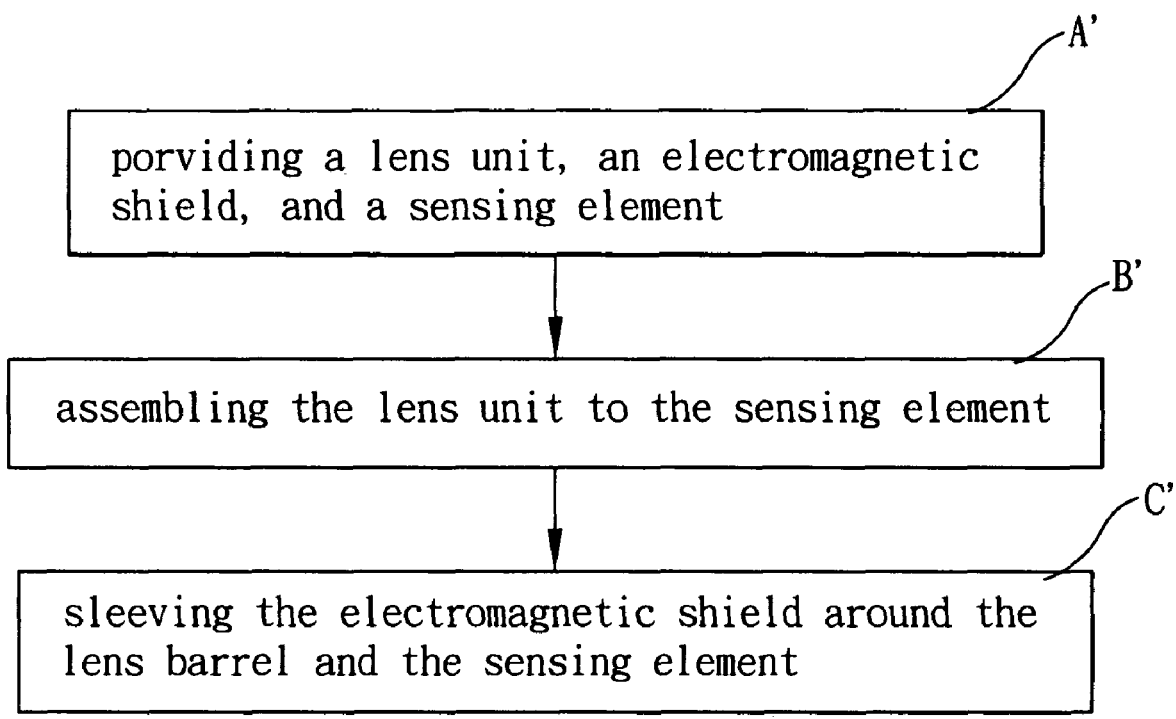
FIG. 19 is a flow chart of a method for making the seventh preferred embodiment.
Figure 20:
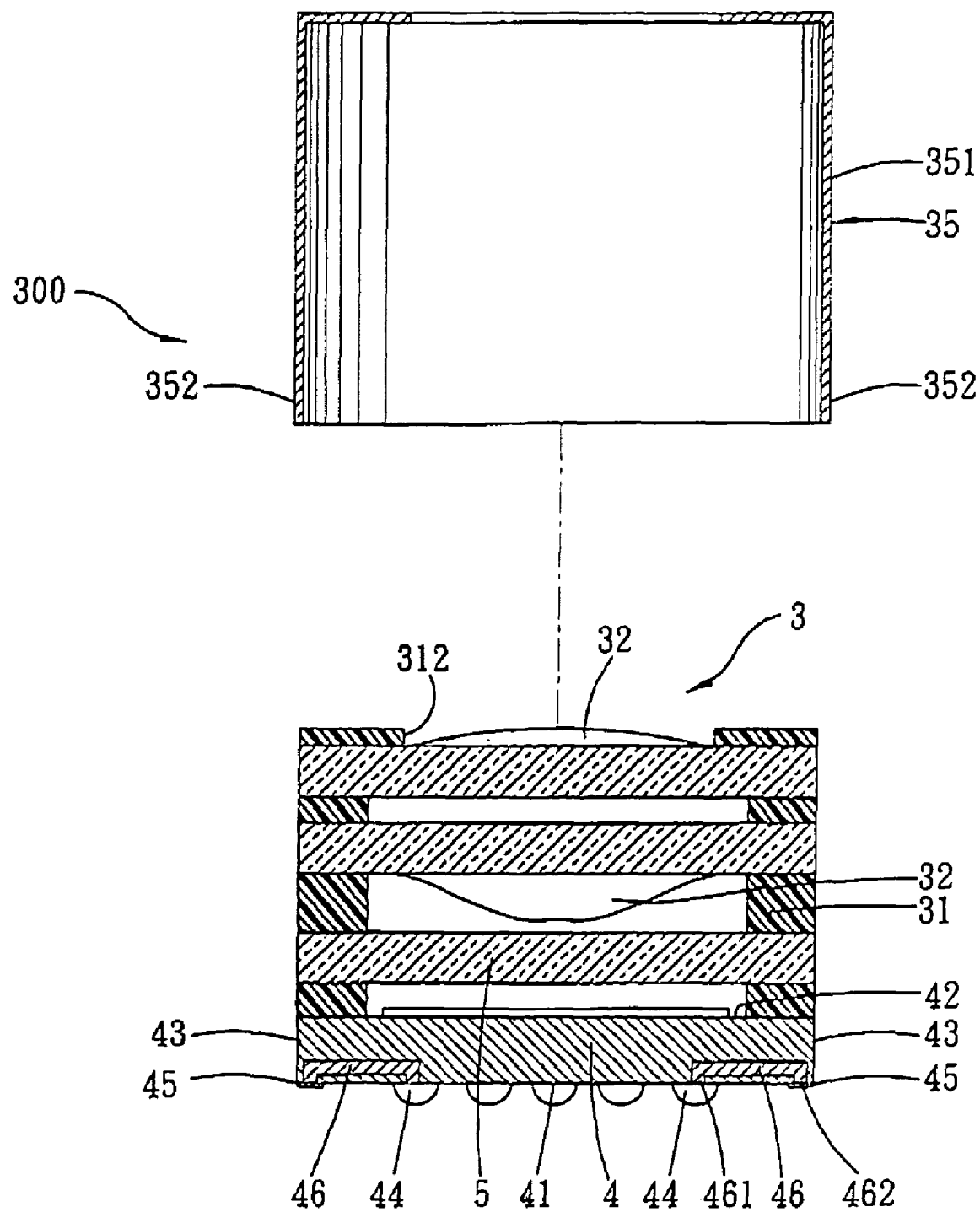
FIG. 20 is an exploded sectional view illustrating an intermediate product of the method for making the seventh preferred embodiment.

Referring to FIGS. 18 to 20, a method for making the seventh preferred embodiment includes the steps of:

A') Providing the Lens Unit 3, the Electromagnetic Shield 35, and the Sensing Element 4:

The lens unit 3 includes the lens barrel 31, and two lenses 32 mounted in the lens barrel 31. The electromagnetic shield 35 includes two opposite grounding portions 352. A plurality of the sensing elements 4 are provided on a wafer (not shown in the figures), and a plurality of the dustproof elements 5 are respectively mounted on the sensing elements 4 (best shown in FIG. 18). The sensing element 4 includes the top face 42, the bottom face 41, the side faces 43 extending between the top and bottom faces 42, 41, the first conductors 44 mounted on the bottom face 41, the second conductors 45 mounted on the bottom face 41, and the grounding elements 46 each having one end 461 connected to one of the first conductors 44 and the other end 462 connected to a corresponding one of the second conductors 45.

B') Assembling the Lens Unit 3 to the Sensing Element 4:

A plurality of the lens units 3 are assembled to the sensing elements 4 of the wafer correspondingly, for example, using a glue. The wafer is baked so that the lens units 3 are firmly connected to the sensing elements 4. The wafer is cut to obtain a plurality of intermediate products.

C') Sleeving the Electromagnetic Shield 35 Around the Lens Barrel 31 and the Sensing Element 4:

The electromagnetic shield 35 is sleeved around the lens barrel 31 and the sensing element 4 of each of the intermediate products so as to obtain the camera module 300.

Figure 21:
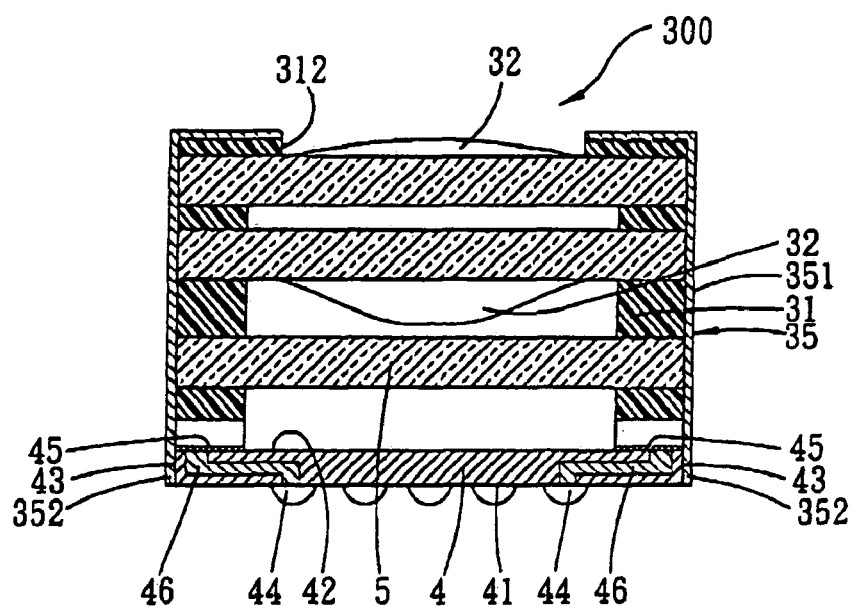
FIG. 21 is a sectional view of an eighth preferred embodiment of a camera module according to this invention.

Referring to FIG. 21, the eighth preferred embodiment of a camera module 300 according to this invention is shown to be similar to the seventh preferred embodiment except that the second conductors 45 are formed as conductive pads mounted on the top face 42 of the sensing element 4 and extending to the side faces 43 of the sensing element 4, and that each of the grounding portions 352 of the electromagnetic shield 35 is formed as a connecting leg provided at a bottom part of the lens barrel 31 and abutting against a corresponding one of the side faces 43 of the sensing element 4 and a corresponding one of the conductive pads.

Figure 22:
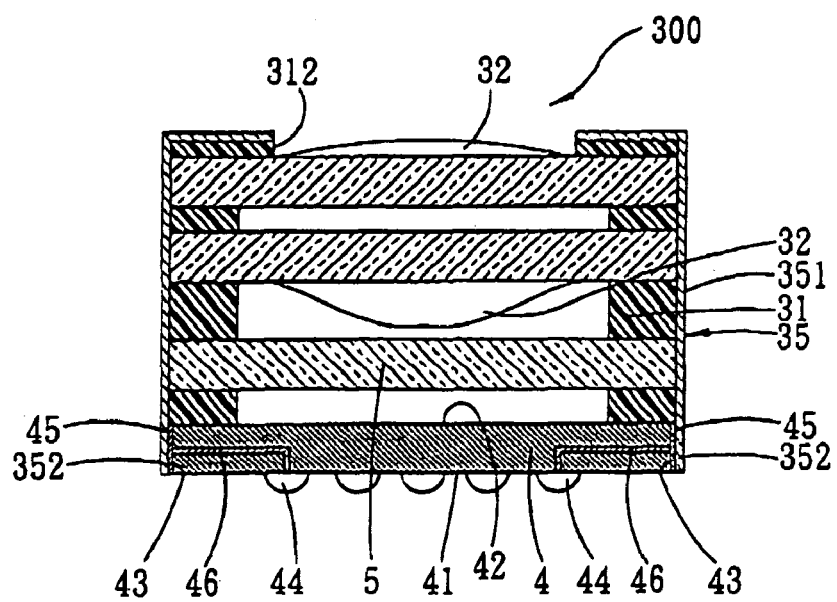
FIG. 22 is a sectional view of a ninth preferred embodiment of a camera module according to this invention.

Referring to FIG. 22, the ninth preferred embodiment of a camera module 300 according to this invention is shown to be similar to the seventh preferred embodiment except that each of the second conductors 45 is formed as a conductive pad mounted on a corresponding one of the side faces 43 of the sensing element 4 and that each of the grounding portions 352 of the electromagnetic shield 35 is formed as a connecting leg provided at a bottom part of the lens barrel 31 and abutting against a corresponding one of the conductive pads.

Figure 23:
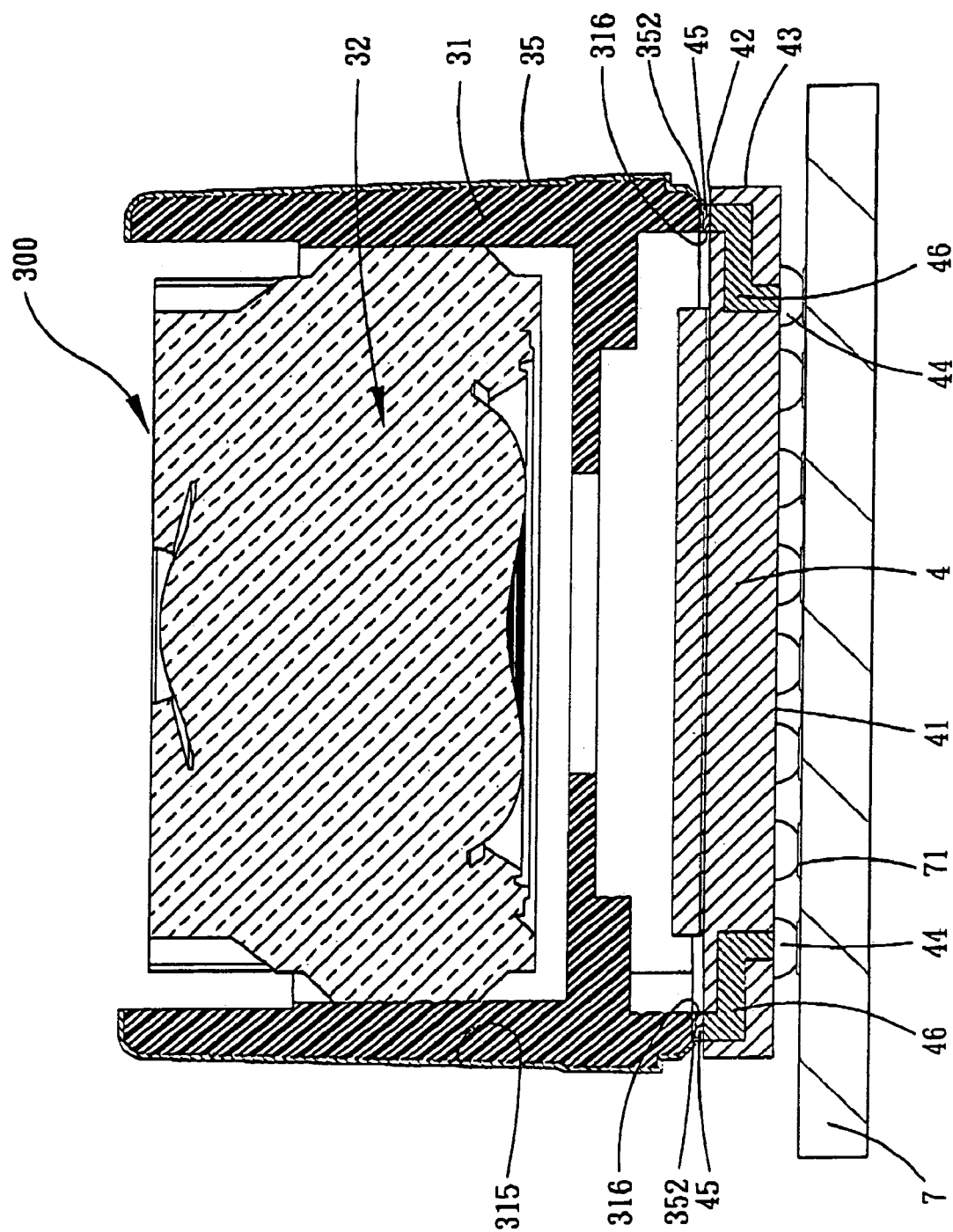
FIG. 23 is a sectional view of a tenth preferred embodiment of a camera module according to this invention mounted on a circuit board.

Referring to FIG. 23, the tenth preferred embodiment of a camera module 300 according to this invention is shown to be similar to the first preferred embodiment except that the lens barrel 31 includes an outer peripheral face 315 and a bottom face 316 laterally extending from the outer peripheral face 315 and that the electromagnetic shield 35 is a metal layer plated on the outer peripheral face 315 and the bottom face 316 of the lens barrel 31 so that the electromagnetic shield 35 is coupled to the lens barrel 31.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A camera module, comprising:
   a lens barrel defining a receiving space and having a top opening communicated with said receiving space;
   a lens mounted in said receiving space and aligned with said top opening;
   a sensing element covered by said lens barrel, disposed below said lens, and spaced apart from said lens, said sensing element including a top face, a bottom face, a side face extending between said top and bottom faces, a plurality of first conductors mounted on said bottom face, at least one second conductor mounted on one of said top, bottom, and side faces, and a grounding element having one end connected to one of said first conductors and the other end connected to said second conductor; and
   an electromagnetic shield coupled to said lens barrel and including a grounding portion electrically connected to said second conductor of said sensing element.

2. The camera module as claimed in claim 1, wherein said second conductor is formed as a conductive pad mounted on said bottom face of said sensing element, said grounding portion of said electromagnetic shield being formed as a connecting leg provided at a bottom part of said lens barrel and abutting against said conductive pad.

3. The camera module as claimed in claim 1, wherein said second conductor is formed as a conductive pad mounted on said bottom face of said sensing element and extending to said side face of said sensing element, said grounding portion of said electromagnetic shield being formed as a connecting leg provided at a bottom part of said lens barrel and abutting against said side face of said sensing element and said conductive pad.

4. The camera module as claimed in claim 1, wherein said second conductor is formed as a conductive pad mounted on said top face of said sensing element, said grounding portion of said electromagnetic shield being formed as a connecting leg provided at a bottom part of said lens barrel and abutting against said conductive pad.

5. The camera module as claimed in claim 4, wherein said lens barrel includes a metallic plating layer formed on an outer peripheral face and a bottom face laterally extending inwardly from said outer peripheral face, said metallic plating layer defining an electromagnetic shield.

6. The camera module as claimed in claim 1, wherein said second conductor is formed as a conductive pad mounted on said top face of said sensing element and extending to said side face of said sensing element, said grounding portion of said electromagnetic shield being formed as a connecting leg provided at a bottom part of said lens barrel and abutting against said side face of said sensing element and said conductive pad.

7. The camera module as claimed in claim 1, wherein said second conductor is formed as a conductive pad mounted on said side face of said sensing element, said grounding portion of said electromagnetic shield being formed as a connecting leg provided at a bottom part of said lens barrel and abutting against said conductive pad.

8. The camera module as claimed in claim 1, wherein said electromagnetic shield is embedded within a peripheral wall of said lens barrel.

9. The camera module as claimed in claim 1, further comprising a housing sleeved over said electromagnetic shield.

10. A method for making a camera module, comprising the steps of:
    providing a lens unit, an electromagnetic shield, and a sensing element, the lens unit including a lens barrel and a lens mounted in the lens barrel, the electromagnetic shield including a grounding portion, the sensing element including a top face, a bottom face, a side face extending between the top and bottom faces, a plurality of first conductors mounted on the bottom face, at least one second conductor mounted on one of the top, bottom, and side faces, and a grounding element having one end connected to one of the first conductors and the other end connected to the second conductor;
    coupling the electromagnetic shield to the lens barrel and the sensing element; and electrically connecting the grounding portion of the electromagnetic shield to the second conductor of the sensing element.

11. The method as claimed in claim 10, wherein the coupling step is conducted by embedding the electromagnetic shield in the lens barrel via insert molding followed by assembling the lens unit to the sensing element, and wherein the electrical connecting step is conducted during assembly of the electromagnetic shield and the sensing element.

12. The method as claimed in claim 10, wherein the coupling step is conducted by assembling the lens unit to the sensing element followed by sleeving the electromagnetic shield around the lens barrel and the sensing element, and wherein the electrical connecting step is conducted during the sleeving of the electromagnetic shield around the sensing element.

13. The method as claimed in claim 10, further comprising a step of sleeving a housing over the electromagnetic shield via insert molding.

14. The method as claimed in claim 10, wherein the step of coupling the electromagnetic shield to the lens barrel and the sensing element includes the step of plating a metal layer on a periphery of the lens barrel.

15. An electronic device, comprising:
    a main body formed with a receiving space and an opening communicated with said receiving space; and
    a camera module received in said receiving space, and including:
       a lens barrel defining a receiving space and, having a top opening communicated with said receiving space of said lens barrel and aligned with said opening of said main body;
       a lens mounted in said receiving space of said lens barrel and aligned with said top opening;
       a sensing element covered by said lens barrel, disposed below said lens, and spaced apart from said lens, said sensing element including a top face, a bottom face, a side face extending between said top and bottom faces, a plurality of first conductors mounted on said bottom face, at least one second conductor mounted on one of said top, bottom, and side faces, and a grounding element having one end connected to one of said first conductors and the other end connected to said second conductor; and an electromagnetic shield coupled to said lens barrel and including a grounding portion electrically connected to said second conductor of said sensing element.

* * * * *